(12) United States Patent
Bartoszek et al.

(10) Patent No.: US 9,991,762 B2
(45) Date of Patent: Jun. 5, 2018

(54) ELECTRIC MOTOR CONNECTIONS FOR POWER TOOLS

(71) Applicant: Ingersoll-Rand Company, Davidson, NC (US)

(72) Inventors: Jason Christopher Bartoszek, Bethlehem, PA (US); Sean C. Ely, Flemington, NJ (US); Douglas Fornell Leavitt, Bethlehem, PA (US)

(73) Assignee: Ingersoll-Rand Company, Davidson, NC (US)

( * ) Notice: Subject to any disclaimer, the term of this patent is extended or adjusted under 35 U.S.C. 154(b) by 194 days.

(21) Appl. No.: 14/742,527

(22) Filed: Jun. 17, 2015

(65) Prior Publication Data
US 2016/0006318 A1    Jan. 7, 2016

Related U.S. Application Data

(60) Provisional application No. 62/019,863, filed on Jul. 1, 2014.

(51) Int. Cl.
*H02K 7/14* (2006.01)
*H02K 5/22* (2006.01)
(Continued)

(52) U.S. Cl.
CPC ............. *H02K 7/145* (2013.01); *H02K 5/225* (2013.01); *H02K 11/0094* (2013.01); *H02K 11/30* (2016.01); *H02K 2203/06* (2013.01)

(58) Field of Classification Search
CPC ........ H02K 7/145; H02K 11/30; H02K 5/225; H02K 11/0094; H02K 2203/06
(Continued)

(56) References Cited

U.S. PATENT DOCUMENTS

| 7,317,269 B2 * | 1/2008 | Boyland ................ H01R 11/12 310/71 |
| 2013/0207491 A1 | 8/2013 | Hatfield et al. |

(Continued)

FOREIGN PATENT DOCUMENTS

| DE | 10 2011 081896 | 2/2013 |
| EP | 1 737 102 | 12/2006 |

(Continued)

OTHER PUBLICATIONS

EP Application No. 15172976.1; Electric Motor Connections for Power Tools; European Search Report; dated Jun. 16, 2016.
(Continued)

*Primary Examiner* — Forrest M Phillips
(74) *Attorney, Agent, or Firm* — Barnes & Thornburg LLP

(57) ABSTRACT

In at least one illustrative embodiment, a power tool may comprise an electric motor comprising a rotor configured to rotate about an axis, a stator assembly including at least three windings arranged around the rotor, and at least three lugs affixed to the stator assembly, where each of the lugs is electrically coupled to one or more of the windings. The lugs may all be arranged to one side of a plane that passes through the axis. The power tool may further comprise at least three electrical wires, where each of the electrical wires is removably coupled to one of the lugs, and a control circuit configured to supply electrical power to the windings, via the electrical wires and the lugs, to drive rotation of the rotor about the axis.

5 Claims, 4 Drawing Sheets

(51) Int. Cl.
*H02K 11/00* (2016.01)
*H02K 11/30* (2016.01)

(58) Field of Classification Search
USPC .......................................................... 310/50
See application file for complete search history.

(56) References Cited

U.S. PATENT DOCUMENTS

| | | | | |
|---|---|---|---|---|
| 2013/0270934 | A1* | 10/2013 | Smith | H02K 3/521 |
| | | | | 310/50 |
| 2013/0313927 | A1* | 11/2013 | Laber | H02K 7/145 |
| | | | | 310/50 |

FOREIGN PATENT DOCUMENTS

| | | | | |
|---|---|---|---|---|
| FR | 2772204 A1 | 6/1999 | | |
| WO | WO 2013077264 A1 * | 5/2013 | ............. | H02K 3/522 |
| WO | WO 2013083688 A1 * | 6/2013 | ............. | H02K 3/50 |
| WO | WO 2015063559 A2 * | 5/2015 | ............. | H02K 3/522 |

OTHER PUBLICATIONS

CN Application No. 201510379335.3; Electric Motor Connections for Power Tools; Office Action; dated Jun. 9, 2017 (English Translation).
China Office Action—dated Feb. 28, 2018—CN 201510379335.3.
English Translation of China Office Action—dated Feb. 28, 2018—CN 201510379335.3.

* cited by examiner

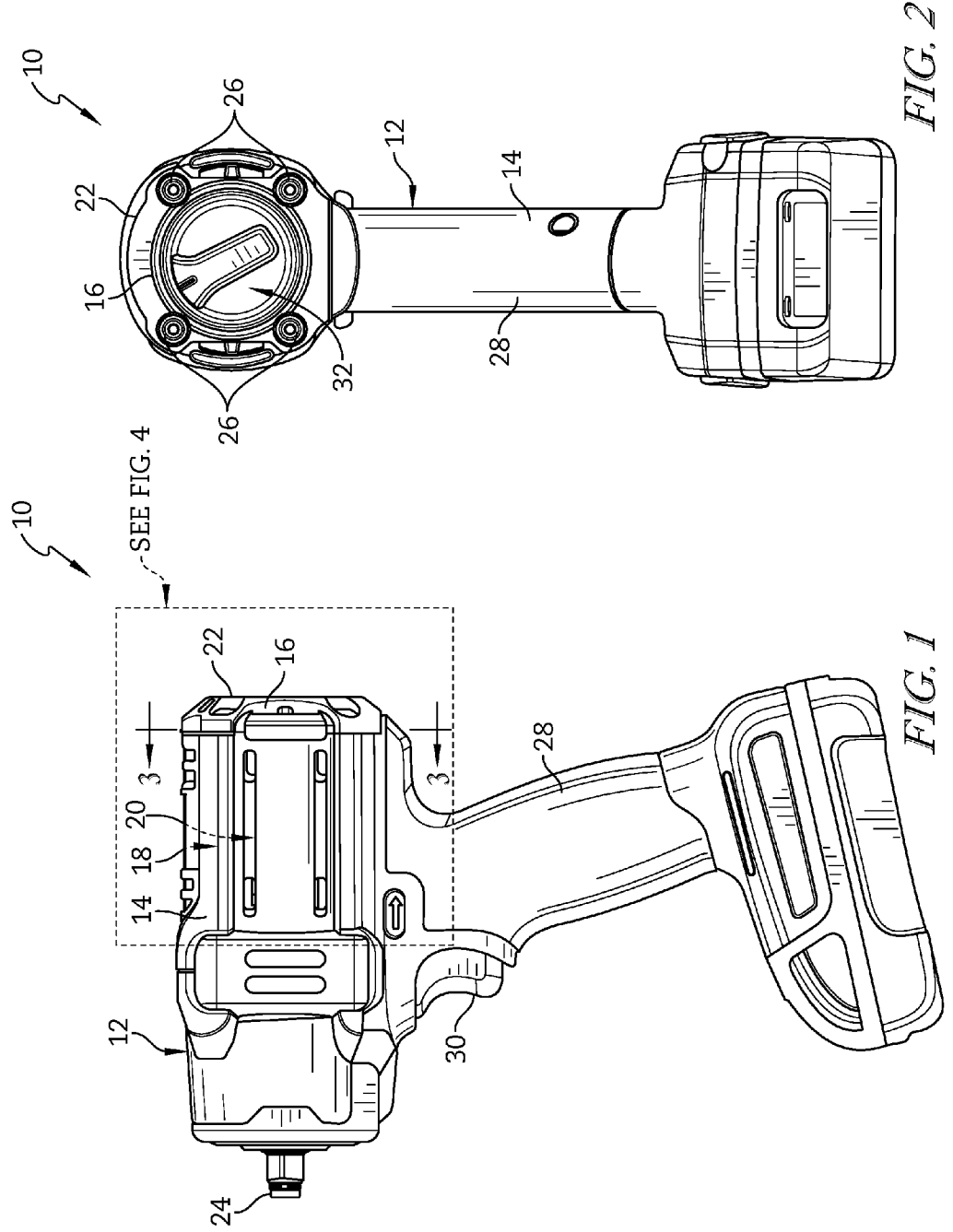

ELECTRIC MOTOR CONNECTIONS FOR POWER TOOLS

CROSS REFERENCE TO RELATED APPLICATIONS

This application claims the benefit of U.S. Provisional Patent Application No. 62/019,863, filed Jul. 1, 2014 and entitled "Electric Motor Connections for Power Tools," which is incorporated by reference herein in its entirety.

TECHNICAL FIELD

The present disclosure relates, generally, to power tools and, more particularly, to electric motor connections for power tools.

BACKGROUND

Electric motors used in power tools—by way of example, brushless direct current ("DC") motors—typically require connection to three heavy gauge "phase" wires that supply the high electrical current that drives the motor. In many existing power tools, this connection is often accomplished by soldering the phase wires to a printed circuit board ("PCB") inside the motor. Traces on the PCB then conduct the high electrical current from the phase wires to soldered termination points where stator windings of the motor are coupled to the PCB. Servicing the motor in such designs may be difficult because de-soldering the phase wires from the PCB can be time consuming and risks damage to the PCB.

Other power tool designs have provided the connection between the phase wires and the stator windings of the motor via solder "lugs" that are mounted to an end of the motor. While such designs may improve serviceability, they have also increased the footprint of the motor (and, hence, the size of the power tool). First, the solder lugs in such designs add length to the motor assembly. Second, because the solder lugs in such designs have typically been spaced evenly around a circumference of the motor, one or more of the phase wires must often be routed around the motor for connection to the corresponding solder lug(s).

SUMMARY

According to one aspect, a power tool may comprise an electric motor comprising (i) a rotor configured to rotate about an axis, (ii) a stator assembly including at least three windings arranged around the rotor, and (iii) at least three lugs affixed to the stator assembly, wherein each of the lugs is electrically coupled to one or more of the windings. The lugs may all be arranged to one side of a plane that passes through the axis. The power tool may further comprise at least three electrical wires, wherein each of the electrical wires is removably coupled to one of the lugs, and a control circuit configured to supply electrical power to the windings, via the electrical wires and the lugs, to drive rotation of the rotor about the axis.

In some embodiments, each of the electrical wires may be soldered to one of the lugs. Each of the lugs may define a circular opening, and each of the electrical wires may be received by one of the circular openings to removably couple each of the electrical wires to one of the lugs. Each of the lugs may include a projection extending radially outward from the stator assembly and defining the circular opening. Each of the electrical wires may be surrounded by one of the projections when each of the electrical wires is received by one of the circular openings. Each projection may include an annular wall that defines the circular opening. An outer perimeter of each projection may circumscribe a generally rectangular or circular shape.

In other embodiments, each of the lugs may include a fastener, and each of the electrical wires may be coupled to one of the lugs by the corresponding fastener. In still other embodiments, each of the lugs may include a female receptacle, and each of the electrical wires may include a male plug configured to be received in one of the female receptacles. The stator assembly may further include a lamination stack that supports the windings. Each of the lugs may be affixed to an external surface of the lamination stack.

According to another aspect, a power tool may comprise an electric motor comprising (i) a rotor configured to rotate about an axis, (ii) a stator assembly including at least three windings arranged around the rotor, and (iii) at least three lugs affixed to the stator assembly, wherein each of the at least three lugs is electrically coupled to one or more of the windings. The at least three lugs may all be arranged to one side of a plane that passes through the axis. The power tool may further comprise at least three electrical wires, wherein each of the electrical wires is surrounded by one of the at least three lugs to removably couple each of the electrical wires to one of the at least three lugs.

In some embodiments, each of the electrical wires may be soldered to one of the at least three lugs. In other embodiments, each of the at least three lugs may include a fastener, and each of the electrical wires may be coupled to one of the at least three lugs by the corresponding fastener. In still other embodiments, each of the at least three lugs may include a female receptacle, and each of the electrical wires may include a male plug configured to be received in one of the female receptacles.

According to another aspect, an electric motor may comprise a rotor configured to rotate about an axis, a stator assembly including at least three windings arranged around the rotor, and at least three lugs affixed to the stator assembly, each of the at least three lugs being electrically coupled to one or more of the windings. Each of the at least three lugs may include a projection extending radially outward from the stator assembly. The projection may define a circular opening configured to receive an electrical wire. The projections of the at least three lugs may all be arranged to one side of a plane that passes through the axis.

In some embodiments, each projection may include an annular wall that defines the circular aperture. Each projection may further include a pair of planar faces arranged opposite one another and interconnected by the annular wall. An outer perimeter of each of the pair of planar faces may circumscribe a generally rectangular shape. In other embodiments, an outer perimeter of each of the pair of planar faces may circumscribe a generally circular shape. The stator assembly may further include a lamination stack that supports the windings. Each of the at least three lugs may be affixed to an external surface of the lamination stack.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

FIG. 1 is a side elevation view of an illustrative power tool;

FIG. 2 is an end elevation view of the power tool of FIG. 1;

Figure 4:
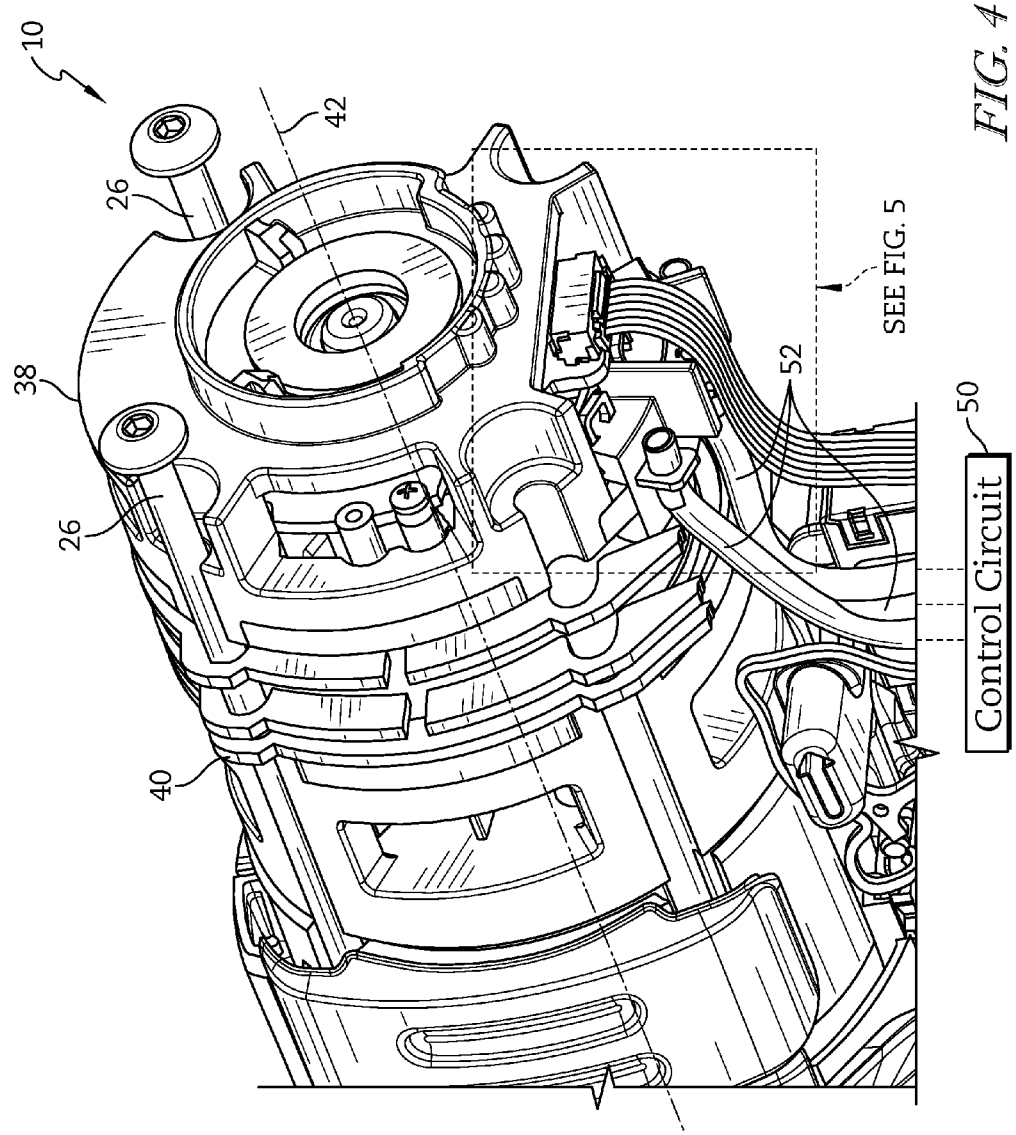
Figure 5:
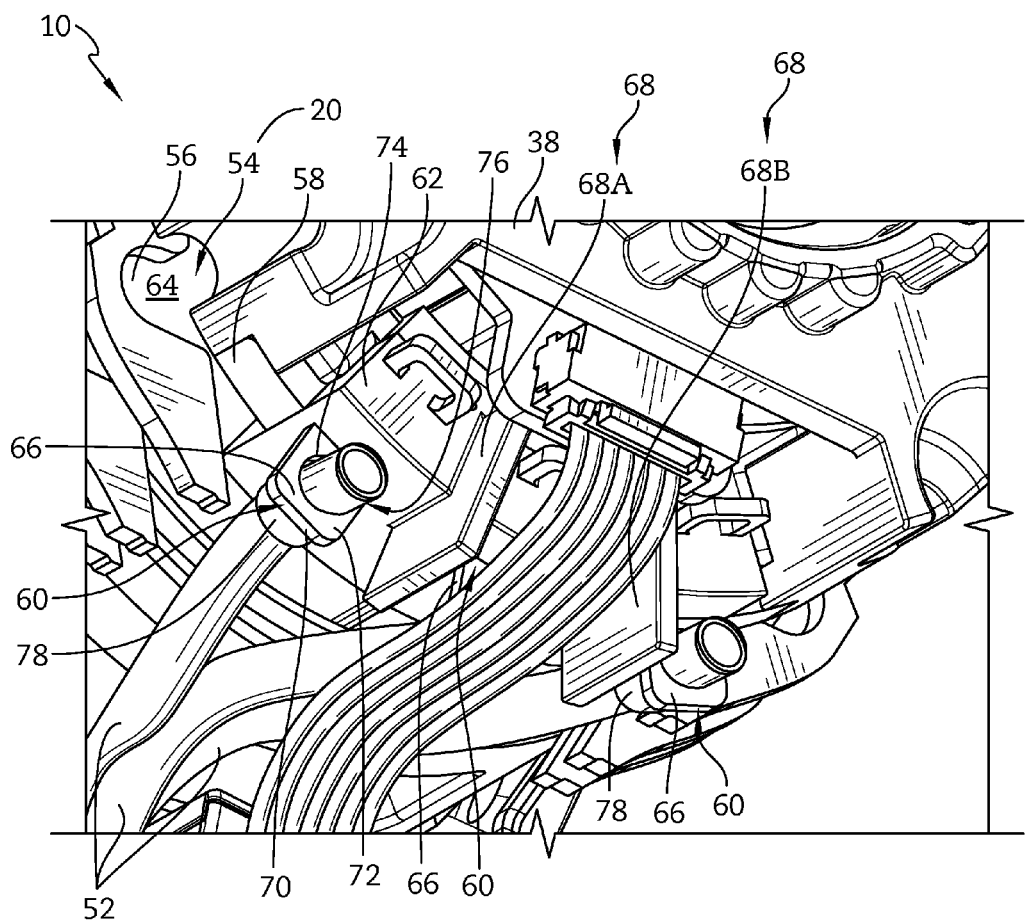

FIG. 4 is a partial perspective view of various components associated with the electric motor of the power tool of FIG. 1 with remaining portions of the power tool omitted for the sake of clarity; and FIG. 5 is a magnified, partial perspective view of various components associated with the electric motor of the power tool of FIG. 1 with remaining portions of the power tool omitted for the sake of clarity.

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring now to FIG. 1, an illustrative power tool 10 is shown. The power tool 10 is illustratively embodied as a cordless, electric power tool (in particular, an electric, pistol-style impact tool). In various embodiments, the power tool 10 may be embodied as a pistol-grip impact tool, an in-line impact tool, or an angle impact tool, such as a right-angle impact tool. It should be appreciated, however, that in other embodiments, the power tool may be embodied as a cordless, electric power tool that does not include an impact mechanism, such as an electric drill, drill driver, ratchet, saw, or the like.

The illustrative power tool 10 includes a tool housing 12 as shown in FIG. 1. The tool housing 12 includes a body 14 and a back cap 16. The body 14 defines an interior space 18 in which an electric motor 20 of the power tool 10 is positioned. The back cap 16 is coupled to the body 14 when the power tool 10 is assembled to close off the interior space 18 and define a back end 22 that is positioned opposite an output end 24 of the power tool 10. The back cap 16 is coupled to the body 14 using fasteners 26 (best seen in FIG. 2) that extend through the back cap 16 and into the interior space 18.

The body 14 of the tool housing 12 defines a handle 28 on which a trigger 30 is provided as shown in FIG. 1. The trigger 30 is used to turn the electric motor 20 on/off and to control a speed of the electric motor 20 during use of the power tool 10. A user interface 32 spaced from the trigger 30 is also provided on the tool housing 12, specifically on the back cap 16, as best seen in FIG. 2. In the illustrative embodiment, the user interface 32 is used to select one of a plurality of modes of operation of the power tool 10. For instance, in some embodiments, the user interface 32 may be used to select a particular mode of operation from among those described in U.S. Provisional Patent Application Ser. No. 62/171,504, filed Jun. 5, 2015. In other embodiments, the user interface 32 may simply regulate the maximum power supplied to the electric motor 20 when the trigger 30 is fully depressed.

Figure 3:
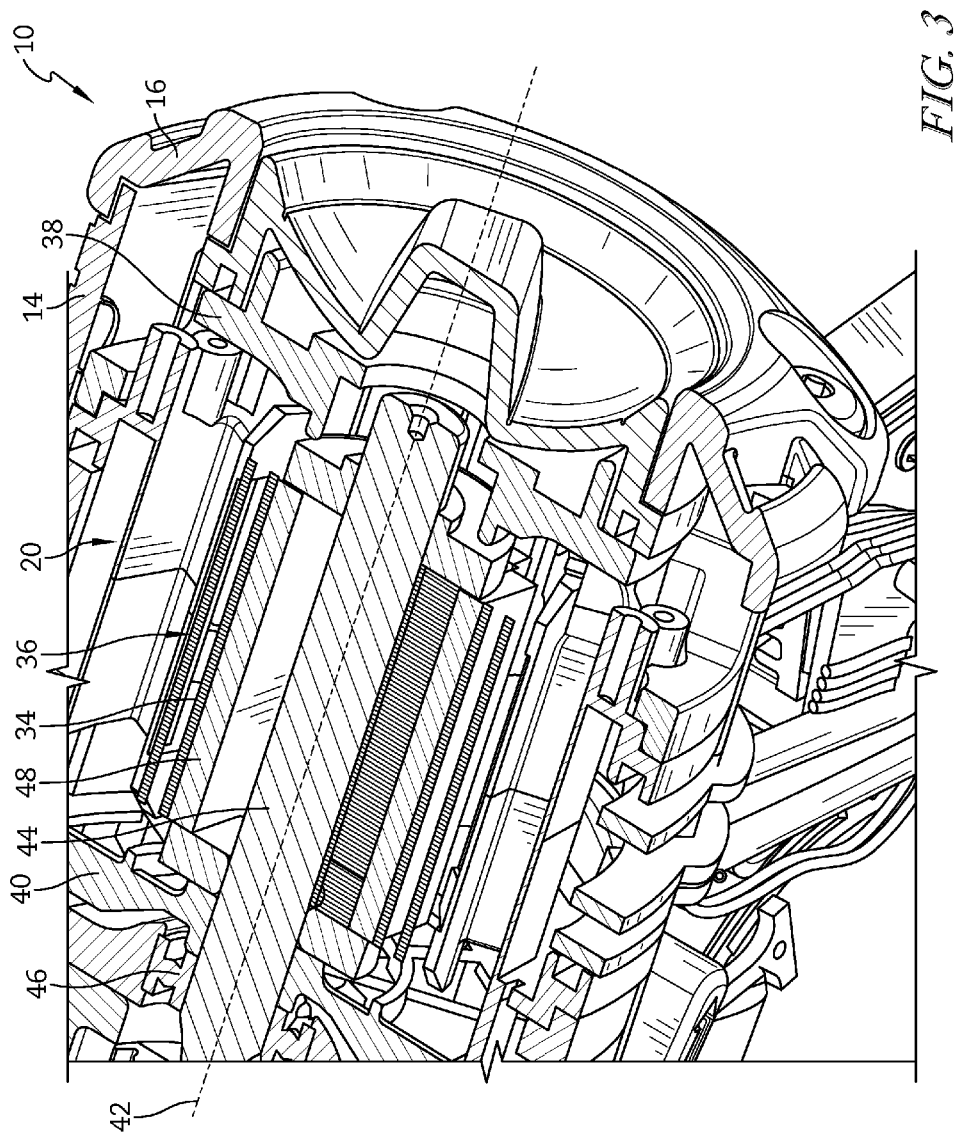
FIG. 3 is a magnified sectional view, taken about line 3-3 of FIG. 1, of an electric motor included in the power tool with remaining portions of the power tool omitted for the sake of clarity.

Referring now to FIG. 3, the body 14 and the back cap 16 are broken away to show components of the electric motor 20. The electric motor 20 is illustratively embodied as a brushless DC motor. As such, the motor 20 generally includes a rotor 34 for providing rotational energy (e.g., to a transmission or drive train of the power tool 10) and a stator 36 for supplying a rotating magnetic field that drives rotation of the rotor 34. The motor 20 also includes a rear endbell 38 and a front endbell 40 that is spaced from the endbell 38 and positioned closer to the output end 24 of the power tool 10 than the endbell 38. The endbells 38, 40 cooperate to align the rotor 34 and the stator 36 so that the rotor 34 and the stator 36 extend parallel to an axis 42. The rotor 34 includes a shaft 44 supported on at least one end by a bearing 46, such that the rotor 34 is configured to rotate about the axis 42. Additionally, the rotor 34 includes one or more permanent magnet(s) 48 that generate a magnetic field.

Referring now to FIG. 4, the power tool 10 illustratively includes a control circuit 50 (shown diagrammatically), and a number of "phase" wires 52 electrically coupling the control circuit 50 to the motor 20. In the illustrative embodiment, the control circuit 50 is positioned in the handle 28 of the power tool 10. It will be appreciated that the power tool 10 includes one or more additional components typically found in power tools (e.g., a transmission or drive train), which are not shown in the drawings or described herein.

Referring now to FIG. 5, the motor 20 includes a stator assembly 54 that has a number of windings arranged around the rotor 34, with an air-gap therebetween. In the illustrative embodiment (i.e., a four-pole, six-tooth, three-phase brushless DC motor), the stator assembly 54 includes three windings that are distributed around the axis 42 to form an even number of poles. In particular, each stator winding includes a pair of windings arranged on opposite sides of the axis 42. The stator windings may be electrically connected to one another in a variety of configurations, including, but not limited to, a series delta configuration, a parallel delta configuration, a series wye (Y-shaped) configuration, and a parallel wye configuration.

As shown in FIG. 5, the stator assembly 54 further includes a lamination stack 56 that supports (and generally surrounds) the stator windings. The stator assembly 54 also includes a pair of insulators 58 (only one of which is shown in FIG. 4) arranged at opposite ends of the stator assembly 54 to insulate the stator windings from other components of the motor 20.

During operation of the motor 20, when electrical power is selectively supplied to one of the stator windings (by the control circuit 50 via one of the electrical wires 52), the resulting current in the stator winding generates a magnetic field that couples to the rotor 34. The magnetic field associated with the permanent magnet(s) in the rotor 34 attempts to align itself with the magnetic field generated by the stator 36, resulting in rotational movement of the rotor 34. The control circuit 50 may sequentially activate the stator windings so that the permanent magnet(s) 48 of the rotor 34 continuously chase(s) the advancing magnetic field generated by the stator windings. The illustrative embodiment of motor 20 also includes a sensor, such as a Hall Effect sensor, that provides a signal to the control circuit 50 that is indicative of a current position of the rotor 34 (relative to the stator 36). The control circuit 50 may utilize this signal when sequentially activating the stator windings to maintain proper timing of the commutation sequence.

In the illustrative embodiment of FIG. 5, the motor 20 further includes a number of solder lugs 60, or electrical terminals, affixed to the stator assembly 54. Each of the solder lugs 60 extends radially outward from a base block 62 that is affixed to one of the insulators 58 of the stator assembly 54 as well as to an external surface 64 of the lamination stack 56 of the stator assembly 54. It is contemplated that other mounting locations (e.g., the endbell 38) for the solder lugs 60 are possible. Each of the solder lugs 60 is electrically coupled to one or more of the stator windings. In the illustrative embodiment of FIG. 5, in which the stator assembly 54 includes three windings, the motor 20 also includes three solder lugs 60, with one solder lug 60 electrically coupled to each stator winding.

The solder lugs 60 may be formed of a metal, metal alloy, or any other material suitable for conducting current between the electrical wires 52 and the stator windings. In some embodiments, the solder lugs 60 may be permanently affixed to the stator assembly 54 (e.g., to the external surface 64 of the lamination stack 56) and/or permanently electrically coupled to the stator windings.

As best seen in FIG. 5, each of the solder lugs 60 includes a projection 66 that is coupled to and extends radially outward from the base block 62. Dividers 68 are coupled to the base block 62 and extend radially outward therefrom between the solder lugs 60. Specifically, one divider 68A extends radially outward from the base block 62 between one pair of the solder lugs 60, and another divider 68B extends radially outward from the base block 62 between another pair of the solder lugs 60.

The projections 66 illustratively have a generally rectangular shape as shown in FIG. 5. Specifically, an outer perimeter of each of the projections 66 circumscribes a generally rectangular shape. In other embodiments, however, the outer perimeter of each of the projections 66 may circumscribe a shape of another suitable geometric form. For example, the outer perimeter of each of the projections 66 may circumscribe a generally circular or trapezoidal shape.

Each projection 66 illustratively includes a planar face 70 and another planar face 72 positioned opposite the planar face 70 as shown in FIG. 5. The planar faces 70, 72 are interconnected by an annular wall 74. The annular wall 74 of each projection 66 defines a circular aperture 76 that extends through each of the planar faces 70, 72. The circular apertures 76 are sized to receive the electrical wires 52, as described in greater detail below.

As best seen in FIG. 5, each of the electrical wires 52 is inserted through one of the circular apertures 76 of the projections 66 such that each of the electrical wires 52 is surrounded by one of the projections 66. In that way, the projections 66 are configured to receive and support the electrical wires 52 when the power tool 10 is assembled (or re-assembled). While received and supported by the projections 66, each of the electrical wires 52 may be soldered to one of the solder lugs 60 to removably couple the electrical wires 52 to the solder lugs 60.

Prior to being soldered to the solder lugs 60, ferrules 78 may be placed in contact with the electrical wires 52 as shown in FIG. 5. Specifically, ferrules 78 may be crimped onto the electrical wires 52 to provide strain relief to the electrical wires 52 as well as prepare the electrical wires 52 for insertion through the circular apertures 76.

In the illustrative embodiment (best seen in FIG. 4), each of the solder lugs 60 is arranged below a centerline of the motor 20 (namely, the axis 42). In other words, the solder lugs 60 are all arranged to one side of a plane that passes through the axis 42. Using FIG. 4 as an example, the solder lugs 60 are all arranged below a plane that passes through the axis 42 and extends generally into and out of the page of FIG. 4. Furthermore, in the illustrative embodiment, the solder lugs 60 are all arranged within a footprint of the stator assembly 54, when viewed from a perspective orthogonal to that plane. This configuration provides for easier routing of the electrical wires 52 to the motor 20 and, thus, easier assembly of the power tool 10. This configuration also improves serviceability of the power tool 10 by allowing easier de-soldering/re-soldering of the electrical wires 52 from/to the motor 20. Furthermore, as the solder lugs 60 do not extend beyond the ends of the motor 20, the overall length of the power tool 10 may be reduced.

It is contemplated that, in other embodiments of the power tool 10, the solder lugs 60 may be replaced with another type of lug 60 that allows the electrical wires 52 to be removably coupled to the lugs 60. For instance, in some embodiments, each of the lugs 60 might include a fastener, such that each of the electrical wires 52 could be removably coupled to one of the lugs 60 by tightening the corresponding fastener (and de-coupled from the lug 60 by loosening the corresponding fastener). In still other embodiments, each of the lugs 60 might include a female receptacle and each of the electrical wires 52 might include a male plug that is configured to be received in one of the female receptacles to removably couple the electrical wires 52 to the lugs 60. By way of example, the male plugs of the electrical wires 52 might be secured in the female receptacles of the lugs 60 via friction forces.

While certain illustrative embodiments have been described in detail in the figure and the foregoing description, such an illustration and description is to be considered as exemplary and not restrictive in character, it being understood that only illustrative embodiments have been shown and described and that all changes and modifications that come within the spirit of the disclosure are desired to be protected. For instance, while the concepts of the present disclosure have been described primarily with reference to brushless DC motors, it is contemplated that the presently disclosed teachings may also be applied to other types of motors, such as brushed DC motors and/or alternating current motors.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A power tool comprising:
   an electric motor comprising (i) a rotor configured to rotate about an axis, (ii) a stator assembly including at least three windings arranged around the rotor, and (iii) at least three lugs affixed to the stator assembly, wherein each of the lugs is electrically coupled to one or more of the windings and wherein the lugs are all arranged to one side of a plane that passes through the axis;
   at least three electrical wires, wherein each of the electrical wires is removably coupled to one of the lugs;
   a control circuit configured to supply electrical power to the windings, via the electrical wires and the lugs, to drive rotation of the rotor about the axis;
   wherein each of the at least three lugs includes a panel depending radially from the electric motor;

wherein each of the panels includes an inner peripheral wall that defines a circular opening that extends through the panel; and a plurality of ferrules;

wherein each of the electrical wires extends into one of the plurality of ferrules; and wherein each of the plurality of ferrules extends into and through each one of the circular openings and engages the inner peripheral wall of the circular opening of the panel to removably couple each of the electrical wires to one of the panels of each of the at least three lugs.

2. The power tool of claim 1, wherein each of the lugs includes a fastener and each of the electrical wires is coupled to one of the lugs by the corresponding fastener.

3. The power tool of claim 1, wherein the stator assembly further includes a lamination stack that supports the windings, each of the lugs being affixed to an external surface of the lamination stack.

4. A power tool comprising:

an electric motor comprising (i) a rotor configured to rotate about an axis, (ii) a stator assembly including at least three windings arranged around the rotor, and (iii) at least three lugs affixed to the stator assembly, wherein each of the at least three lugs is electrically coupled to one or more of the windings and wherein the at least three lugs are all arranged to one side of a plane that passes through the axis;

at least three electrical wires;

wherein each of the at least three lugs includes a panel depending radially from the electric motor;

wherein each of the panels includes an inner peripheral wall that defines an opening that extends through the panel; and a plurality of ferrules;

wherein each of the plurality of ferrules extends into and through each one of the openings and engages the inner peripheral wall of the opening of the panel to removably couple each of the electrical wires to one of the panels of each of the at least three lugs.

5. The power tool of claim 4, wherein each of the at least three lugs includes a fastener and each of the electrical wires is coupled to one of the at least three lugs by the corresponding fastener.

* * * * *